(12) United States Patent
Steiner et al.

(10) Patent No.: US 11,037,773 B2
(45) Date of Patent: Jun. 15, 2021

(54) TURBO MOLECULAR PUMP FOR MASS SPECTROMETER

(71) Applicant: Bruker Daltonik GmbH, Bremen (DE)

(72) Inventors: Urs Steiner, Aarau (CH); Jochen Franzen, Bremen (DE)

(*) Notice: Subject to any disclaimer, the term of this patent is extended or adjusted under 35 U.S.C. 154(b) by 0 days.

(21) Appl. No.: 16/525,165

(22) Filed: Jul. 29, 2019

(65) Prior Publication Data

US 2020/0058479 A1   Feb. 20, 2020

(30) Foreign Application Priority Data

Aug. 14, 2018 (DE) .................. 102018119747-0

(51) Int. Cl.
| | |
|---|---|
| *H01J 49/04* | (2006.01) |
| *F04D 19/04* | (2006.01) |
| *H01J 49/24* | (2006.01) |
| *H01J 49/26* | (2006.01) |
| *F04D 29/38* | (2006.01) |
| *F04D 17/02* | (2006.01) |
| *F04D 25/12* | (2006.01) |

(52) U.S. Cl.
CPC .......... *H01J 49/0422* (2013.01); *F04D 17/02* (2013.01); *F04D 17/025* (2013.01); *F04D 19/042* (2013.01); *F04D 25/12* (2013.01); *F04D 29/384* (2013.01); *H01J 49/24* (2013.01); *F05D 2300/121* (2013.01); *F05D 2300/125* (2013.01); *F05D 2300/133* (2013.01); *H01J 49/26* (2013.01)

(58) Field of Classification Search
None
See application file for complete search history.

(56) References Cited

U.S. PATENT DOCUMENTS

| | | | | |
|---|---|---|---|---|
| 3,504,990 A | * | 4/1970 | Sugden | ............. B63H 1/16 |
| | | | | 416/176 |
| 3,782,857 A | * | 1/1974 | Svilans | ............. F04D 29/24 |
| | | | | 416/236 R |
| 5,676,801 A | * | 10/1997 | El-Sayed | ............. F04D 17/02 |
| | | | | 202/182 |
| 5,927,940 A | | 7/1999 | Lotz | |
| 6,508,631 B1 | | 1/2003 | Smith et al. | |
| 6,524,060 B2 | | 2/2003 | Conrad et al. | |
| 7,011,491 B2 | | 3/2006 | Englander | |
| 7,811,065 B2 | * | 10/2010 | Stuart | ............. F04D 29/601 |
| | | | | 417/250 |
| 8,757,987 B2 | * | 6/2014 | Stuart | ............. F04D 19/042 |
| | | | | 417/250 |

(Continued)

FOREIGN PATENT DOCUMENTS

| | | |
|---|---|---|
| CN | 1860301 A | 11/2006 |
| CN | 101052809 A | 10/2007 |

(Continued)

*Primary Examiner* — Peter J Bertheaud
*Assistant Examiner* — Geoffrey S Lee
(74) *Attorney, Agent, or Firm* — Benoit & Côté Inc.

(57) ABSTRACT

The invention relates to turbo molecular pumps enabling high pumping speed. The disclosure suggests using one or more cage-like rotor stages to optimize pumping speed on vacuum systems with low gas flows and low ultimate pressures. This allows for a smaller motor as well as smaller overall form factor and makes it well suited, in particular, for compact mass spectrometers and desk-top mass spectrometers.

22 Claims, 9 Drawing Sheets

Section A-A
1:1

(56) References Cited

U.S. PATENT DOCUMENTS

| | | | |
|---|---|---|---|
| 8,764,413 B2 | 7/2014 | Stones | |
| 8,851,865 B2 | 10/2014 | Schofield | |
| 2001/0018018 A1* | 8/2001 | Conrad | F04D 19/046 |
| | | | 415/90 |
| 2002/0064451 A1 | 5/2002 | Conrad et al. | |
| 2005/0249591 A1* | 11/2005 | Awdalla | F01D 1/06 |
| | | | 415/199.2 |
| 2006/0263205 A1* | 11/2006 | Kawasaki | F04D 19/046 |
| | | | 415/143 |
| 2008/0166219 A1 | 7/2008 | Stuart et al. | |
| 2009/0081022 A1 | 3/2009 | Yang | |
| 2010/0098558 A1 | 4/2010 | Makarov et al. | |
| 2011/0286864 A1 | 11/2011 | Stones | |
| 2017/0267323 A1* | 9/2017 | Sharrow | B64C 11/16 |

FOREIGN PATENT DOCUMENTS

| | | |
|---|---|---|
| CN | 104613008 A | 5/2015 |
| EP | 3112688 A1 | 6/2019 |

* cited by examiner

TURBO MOLECULAR PUMP FOR MASS SPECTROMETER

BACKGROUND OF THE INVENTION

Field of the Invention

The invention relates to turbo molecular pumps enabling high pumping speed.

Description of the Related Art

A conventional turbo molecular pump typically consists of a low pressure input stage and a high pressure exhaust section. The low pressure input stage consists of a stack of rotors, each with multiple, angled blades which rotate at very high tangential speed mounted in a tube-like housing. Gas molecules, hit by the underside of the angled blades, move with momentum in the direction of the higher pressure exhaust section.

The low pressure input stage thus consists of stacks of discoidal turbo rotors with radially extending rotor blades. Usually there are non-rotating stators with oppositely angled radial blades between each of the rotors. The pumping speed of a turbo molecular pump is given by the blade diameter and the rotational speed (in rotations per minute, RPM) of the turbo rotor blades. The rotational speed is limited by the strength of the blade material which has to withstand the centrifugal forces and which is heated to temperatures generated by the overall gas load to be pumped.

Experience teaches that the material strength of the blades of turbo molecular pumps presently commercially available is already optimized and cannot be substantially improved. In many cases, such as in mass spectrometric analyzers, the gas load is minimal. In such analyzers with long ion trajectories, the mean free ion path (average distance of propagation between two collisions with other gaseous matter) shall be kept as long as possible, meaning the absolute end pressure must be as low as possible. To get a mean free path of greater than ten centimeters, pressures below $10^{-5}$ Torr (~$1.3 \times 10^{-3}$ Pascal) are needed. In many high resolution MS systems (e.g. time-of-flight, ion cyclotron resonance cells and the Orbitrap® from Thermo Fisher Scientific) the ion can reside seconds in the analyzer, requiring mean free paths of larger than one meter. In such systems, pressures below $10^{-7}$ Torr (~$1.3 \times 10^{-5}$ Pascal) such as reaching down to $10^{-11}$ Torr (~$1.3 \times 10^{-9}$ Pascal) are needed.

To achieve such low end pressures in the presence of a gas load, the pumping speed needs to be high, which at present entails large pump sizes with large rotor diameter. This in turn demands a large vacuum chamber, which in turn increases overall system size and substantially increases cost. The gas load of MS systems mainly stems from the ion source and of some outgassing of surfaces. In some cases, additional gas is introduced into collision cells of the MS system to cool ions or for fragmentation of molecular ions, which ultimately leaks out and thereby adds to the gas load of other parts of the mass spectrometer's vacuum recipient.

In many cases, mass spectrometers contain inlets and ion sources with higher gas loads. If these regions can work with higher pressures, multi-ported turbo molecular pumps can be used. In this case, interstage openings are placed at the appropriate pressure level of the pump. The height and width of these openings are selected to support sufficient gas flow. To optimize gas flow, rotors and stators may be removed in these sections.

Turbo molecular pumps further often contain a so-called Holweck stage which is a type of drag compression stage with radial flow component. In essence, it is a rotating screw-like rotor turning in a static cylinder. This creates a rotating channel towards the higher pressure region. Surface friction is used to move molecules along the channel. Another method of a drag stage encompasses rotating disks, with or without grooves in them (so-called Gator stage). This creates a radial flow component. However, all these known drag stages are positioned close to the high pressure exhaust section, not at the low pressure end of the volume to be evacuated.

The related art may be seen to comprise:

U.S. Pat. No. 6,508,631 B1 discloses a radial flow turbomolecular vacuum pump including a gas inlet, a gas outlet, a rotor, and a stator. The rotor includes a first rotor surface that is positioned in a substantially radial direction. A plurality of blades extends from the first rotor surface in a substantially axial direction. The stator includes a first stator surface that is positioned proximate to the first rotor surface in the substantially radial direction. A first and second plurality of vanes extend from the first stator surface and generally forms an annulus therebetween for receiving the first plurality of blades. A drive shaft is coupled to the rotor and positioned in the substantially axial direction. A motor is coupled to the drive shaft and rotates the rotor relative to the stator which causes gas to be pumped from the gas inlet to the gas outlet in the substantially radial direction.

U.S. Pat. No. 7,011,491 B2 suggests a friction vacuum pump comprising a fixed element bearing rows of stator blades and a rotating element bearing rows of rotor blades which are arranged concentrically with respect to an axis of rotation of the rotating element and mesh with each other. In order to create in the axial direction a short friction pump, the elements bearing the rows of rotor blades and stator blades extend in a substantially radial manner and the longitudinal axes of the blades extend in a substantially axial manner.

US 2009/0081022 A1 presents a radial turbomolecular vacuum pump that includes a rotor made from a silicon rotor surface comprising monolithically fabricated micro blades, and a stator made from a silicon stator surface comprising corresponding monolithically fabricated grooves. The micro blades and grooves are arranged in multiple rings, and the rotor and stator disks are placed in proximity, creating interdigitated stator and rotor blade rings which form a multi-stage compression in the radial direction.

The first three aforementioned prior art documents have in common that the axially extending blades on the stator and rotor disks are extremely short. The objective of these disclosures lies first and foremost in providing flat or disk-shaped molecular or friction pumps of little height. The pumping speed on the other hand is scarcely of interest.

Also, the following disclosures might be seen as related:

US 2008/0166219 A1 shows a differentially pumped mass spectrometer system with a mass spectrometer having first and second pressure chambers through which, during use, ions are conveyed along a path. A pump assembly for differentially evacuating the chambers is attached to the mass spectrometer that comprises a housing attached to the mass spectrometer and a cartridge inserted into the housing. The cartridge has a plurality of inlets each for receiving fluid from a respective pressure chamber and a pumping mechanism for differentially pumping fluid from the chambers. The cartridge is inserted into the housing such that the pumping mechanism is inclined relative to the ion path, but with the cartridge protruding into the mass spectrometer to such an extent that at least one of the inlets at least partially protrudes into its respective chamber without crossing the ion path.

US 2010/0098558 A1 relates to a vacuum apparatus having a vacuum pump for the evacuation of one or a plurality of volumes, the vacuum pump having a plurality of pressure stages and at least two suction inlets. An outer suction inlet for a first pressure stage spatially encompasses an inner suction inlet for a second pressure stage such that the inner suction inlet seals only against pressure within the outer suction inlet, not against external pressure.

US 2011/0286864 A1 discloses first and second pump stages that provide a flow-path from an inlet to an outlet, the flow-path being arranged so that molecules entering the first inlet pass to the outlet through the first and second pump stage, and so that molecules entering the second inlet pass to the outlet through an inter-stage volume and second pump stage; wherein the first and second pump stages each comprise a turbo-molecular sub-stage and a molecular drag sub-stage.

The last three aforementioned prior art documents have in common that the blades are illustrated to exclusively extend in a radial direction from a central shaft and are therefore limited to pumps having largely axial flow effect.

In view of the foregoing, there is still a need for turbo molecular pumps that afford high pumping performance while keeping at the same time small dimensions or a compact design, in particular, for use with mass spectrometers.

SUMMARY OF THE INVENTION

The present invention makes use of one or more novel cage-like rotor stages, as the case may be, in addition to conventional rotor stages often used in the art, to optimize pumping speed on vacuum systems with low gas flows and low ultimate pressures. This allows for a smaller motor as well as smaller overall form factor and makes it well suited, in particular, for compact mass spectrometers (MS) and desk-top mass spectrometers.

The present disclosure relates to a turbo molecular pump comprising a stationary frame structure and at least one rotor stage located at a low pressure input region, wherein the rotor in the at least one rotor stage rotates with respect to the stationary frame structure during operation and has a central shaft receiving member, which may comprise a hollow receptacle for accommodating a drive shaft that enables setting the central shaft receiving member in rotation, from which a first rotor blade portion extends substantially radially outward and is connected to, such as by transitioning (smoothly) into, a second rotor blade portion which extends substantially paraxially to, and along the central shaft receiving member towards a high pressure output region, wherein, during operation, the first and second rotor blade portions deflect gaseous matter substantially paraxially and radially inwards.

The basic idea of the present disclosure is to complement the traditional, merely radially extending rotor blades in a first rotor stage located at the low pressure input region with a cage-like setting having a set of additional paraxial rotor blade portions connected, preferably in one piece, to the well-known top radial rotor blade portion. In such design, the rotor blade portions cover both the circumference and top of the notional rotor "cage". In so doing and providing for the paraxial rotor blade portions of such turbo molecular pump being at least partially (and preferably fully) fluidically exposed to the volume to be evacuated, the pumping speed can be substantially increased because it is proportional both to the blade speed as well as the rotor blade portion length along the rotational axis. In addition, it becomes possible to also extract gaseous matter perpendicularly to the rotor axis (drive shaft axis), and this in principle along the whole circumference of 360 degrees around the pump rotor stage which correspondingly increases the active pumping cross-section area. This means that pump dimensions can be reduced compared to conventional designs while not taking any losses in pumping power.

In various embodiments, the rotor blades in the first rotor blade portion can be inclined in relation to a first plane perpendicular to the central shaft receiving member, and the rotor blades in the second rotor blade portion, which may comprise rounded edges at a point of connection to the rotor blades in the first rotor blade portion, can be inclined in relation to a substantially hollow-cylindrical envelope contour defined by the second rotor blade portion.

In various embodiments, a third rotor blade portion can be foreseen which extends substantially radially outward from the central shaft receiving member and connects to the second rotor blade portion at a position between the low pressure input region and high pressure output region in order to enhance mechanical centrifugal stability of the second rotor blade portion, wherein, during operation, the third rotor blade portion deflects gaseous matter substantially paraxially. Preferably, the rotor blades in the third rotor blade portion are inclined in relation to a second plane perpendicular to the central shaft receiving member.

In various embodiments, a number of rotor blades in at least one of the first rotor blade portion and second rotor blade portion (as the case may be and/or the third rotor blade portion) can be odd in order to reduce resonant vibrations that might otherwise built up due to unavoidable mechanical tolerances during production.

In various embodiments, adjacent rotor blades in at least one of the first rotor blade portion and second rotor blade portion (as the case may be and/or the third rotor blade portion) can substantially overlap each other such as to prevent gaseous matter having entered the inside from escaping or otherwise leaving, except in a direction towards the high pressure output region.

In various embodiments, a ring-like support structure may be foreseen that connects the distal ends of the rotor blades in the second rotor blade portion in order to enhance mechanical stability.

In various embodiments, a paraxial extension of the second rotor blade portion may be equal to or greater than a radial extension of the first rotor blade portion. Depending on the paraxial extension (or height) of the cage-like rotor, the pumping speed may be increased by factors of three or more compared with a conventional turbo molecular pump of equal diameter having only paraxial pumping action.

In various embodiments, the central shaft receiving member can flare from the high pressure output region to the low pressure input region, at least section-wise, in order to impart the gaseous matter deflected substantially radially inwards from the second rotor blade portion an additional momentum in a direction toward the high pressure output region.

In various embodiments, the rotor blades in the second rotor blade portion may be helically distorted along a substantially hollow-cylindrical envelope contour defined by the second rotor blade portion in order to deflect the gaseous matter from the second rotor blade portion both substantially paraxially and radially inwards.

In various embodiments, at least one conventional rotor-stator stage having radially extending, interdigital rotor-stator blades may be located downstream from the at least one rotor stage situated at the low pressure input region. Further conventional rotor-stator stages can include for example Holweck and/or Gator stages, as a person skilled in the art sees fit.

In various embodiments, the rotor in the at least one rotor stage can be produced from stable metals such as aluminum, magnesium, titanium or alloys thereof, for example gamma titanium aluminide. Preferably, the rotor in the at least one rotor stage is produced by additive manufacturing, such as using metal powder fusing, or cast in one piece.

In various embodiments, the stationary frame structure may comprise a plurality of arcs converging at a low pressure input region end of the central shaft receiving member in a bearing. Preferably, the bearing is one of a magnetic bearing (e.g. having a plurality of permanent magnets) and ball bearing (e.g. having a plurality of ceramic balls with super-sleek surfaces). Further preferred is that the stationary frame structure also comprises a flange spaced apart from the low pressure input region along the central shaft receiving member, to which flange the plurality of arcs is connected.

In some embodiments, the first rotor blade portion close to the low pressure input region may be comprised of an element that is (largely) impenetrable to gaseous matter, e.g. a largely solid flat plate or disk, such that the first rotor blade portion does hardly exert any paraxial pumping action, if any. Most of the pumping action would then be contributed by the motion of the paraxial rotor blade portion pumping circumferentially radially inward. It goes without saying that such configuration would show its fullest potential when the paraxial rotor blade portion is fully exposed to the volume to be evacuated and when the central shaft receiving member provides for angled surfaces, e.g. frusto-conically flaring surfaces, which deflect gaseous matter having been propelled radially inwards by the rotation of the paraxial rotor blade portion in a paraxial direction toward the high pressure output region of the turbo molecular pump.

The disclosure also relates to a mass spectrometer, comprising a recipient which has at least one compartment that, during operation, is to be maintained at a pressure substantially lower than ambient atmospheric pressure, such as below $10^{-5}$ Torr (~$1.3 \times 10^{-3}$ Pascal), below $10^{-7}$ Torr (~$1.3 \times 10^{-5}$ Pascal) or even below $10^{-11}$ Torr (~$1.3 \times 10^{-9}$ Pascal), and a turbo molecular pump in accordance with any one of the embodiments as hereinbefore described, which is mounted at the at least one compartment such that the second rotor blade portion substantially protrudes into the at least one compartment, thereby extracting gaseous matter from the at least one compartment radially inward in addition to just paraxially as with conventional turbo molecular pumps.

In various embodiments, the at least one compartment may contain at least one mass analyzer or at least one source of gas (e.g. wall surface outgassing, a collision cell or gas-operated ion source), and the second rotor blade portion can protrude such as to be directly exposed to gaseous matter escaping or otherwise leaving the at least one mass analyzer and emanating from the at least one source of gas, respectively. Preferably, the at least one compartment contains at least one of a time-of-flight drift tube, Kingdon-type mass analyzer (such as the Orbitrap® from Thermo Fisher Scientific), 2D or 3D ion trap, mass filter and an ion cyclotron resonance cell.

In various embodiments, conforming to a multi-port configuration, a second rotor stage at a position spaced apart from the low pressure input region may be foreseen, which second rotor stage is of similar (cage-like) configuration as the at least one rotor stage located at the low pressure input region. It goes without saying that any of the characteristics and features explained with reference to the at least one rotor stage located at the low pressure input region as hereinbefore described are equally applicable to this second rotor stage intended for evacuating a separate compartment to a different, slightly higher pressure level than the rotor stage at the low pressure input region. It is particularly preferred that any rotor blade portion extending paraxially in the second rotor stage has a smaller paraxial extension (i.e. the second rotor stage can be much flatter) than that in the first rotor stage at the low pressure input region in order to mitigate the additional gas-dynamical strain resulting from the higher pressure level at this intermediate pumping port. It goes without saying that the turbo molecular pump, in a further advancement of the technical teaching, can have more than two rotor stages of the novel design (in addition to conventional rotor-stator stages) with corresponding port openings for fluid connection to further compartments to be evacuated to slightly different pressure levels.

The disclosure further relates to a mass spectrometer, comprising a recipient which has at least two adjacent compartments that, during operation, are to be maintained at (different) pressures substantially lower than ambient atmospheric pressure, and a turbo molecular pump of multi-port configuration in accordance with any one of the respective embodiments as hereinbefore described, which is mounted at the at least two adjacent compartments such that the second rotor blade portion (of the first rotor stage situated at the low pressure input region) substantially protrudes into a first one of the at least two adjacent compartments (to be held at the lowest pressure level) and the second rotor stage is fluidically connected to a second one of the at least two adjacent compartments (to be held at a higher pressure level in relation thereto).

BRIEF DESCRIPTION OF THE DRAWINGS

The invention can be better understood by referring to the following figures. The elements in the figures are not necessarily to scale, emphasis instead being placed upon illustrating the principles of the invention (often schematically).

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

The basic idea of the invention is to increase pumping speed by increasing the rotor blade cross section exposed to the chamber to be evacuated. This increases the probability of molecules to hit the rotor blades at high to ultra-high vacuum. This objective can be achieved by providing a rotor blade assembly of cage-like configuration, preferably fully exposed to the vacuum chamber, see concept illustrated schematically in FIG. 1B. The cage-like rotor blade assembly encompasses paraxially arranged rotor blade portions along the circumference of the notional "cage". In addition, it may encompass one or more sets of radial rotor blade portions for holding the paraxial rotor blade portions in place.

Figure 1A:
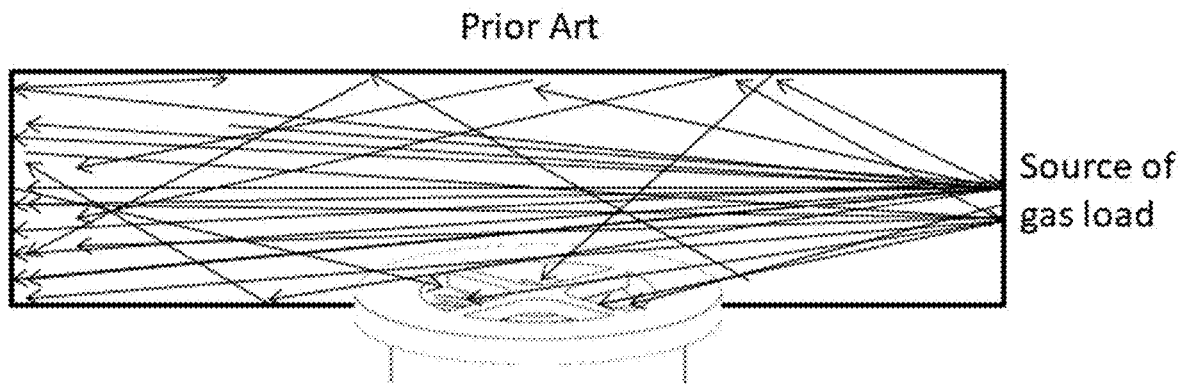
FIG. 1A schematically depicts a principle underlying the prior art.
Figure 1B:
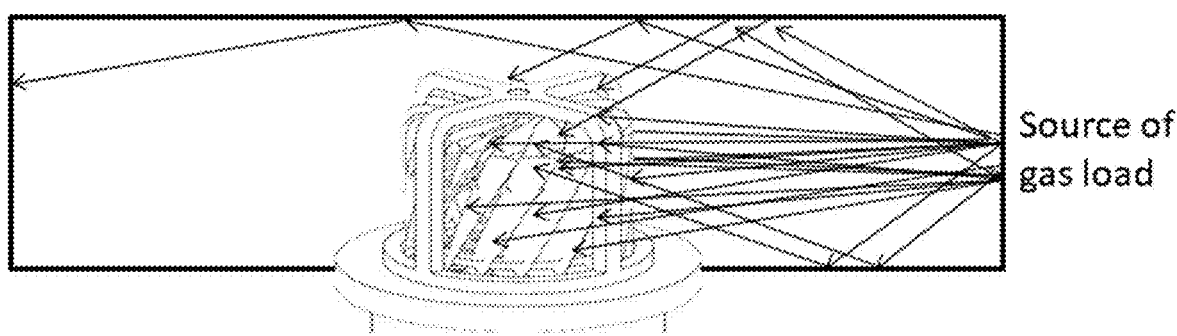
FIG. 1B schematically depicts a principle underlying the present disclosure.

The pumping speed is increased by the length of the paraxial rotor blade portions moving at the circumferential speed versus just the tips of the radially extending rotor blades in a traditional turbo molecular pump as known from the prior art. This exposed arrangement also allows molecules to hit and be aspirated into the cage-like rotor assembly from all sides, radially inward as well as paraxially, as shown in FIG. 1B. This is especially of importance at pressures with a mean free path of larger than ten centimeters. Depending on the vacuum pressure to be achieved at the low pressure input region and the paraxial extension of the paraxial rotor blade portion, the pumping speed can be significantly increased, compared with conventional turbo molecular pumps of equal diameter.

Figure 2A:
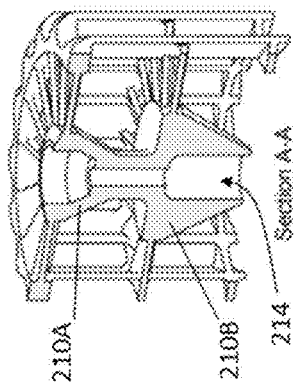
FIG. 2A presents a first view of a first novel rotor design in accordance with principles of the present disclosure.
Figure 2B:
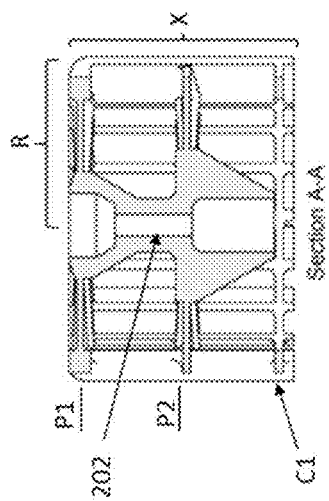
FIG. 2B presents a second view of the rotor design of FIG. 2A.
Figure 2C:
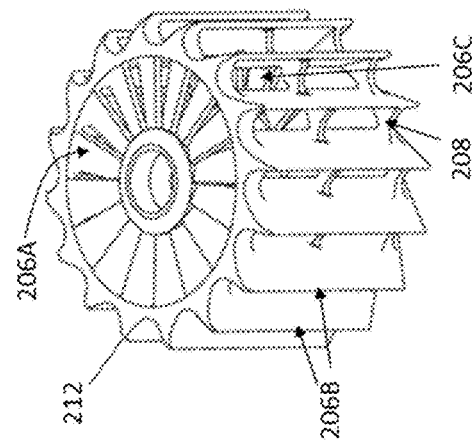
FIG. 2C presents a third view of the rotor design of FIG. 2A.
Figure 2D:
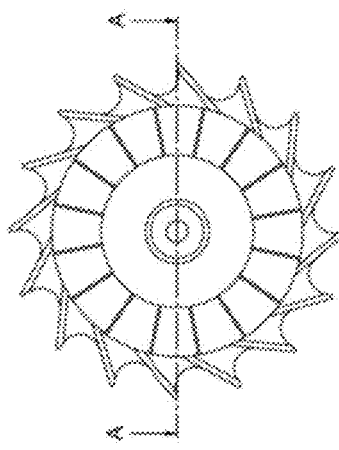
FIG. 2D presents a fourth view of the rotor design of FIG. 2A.
Figure 2E:
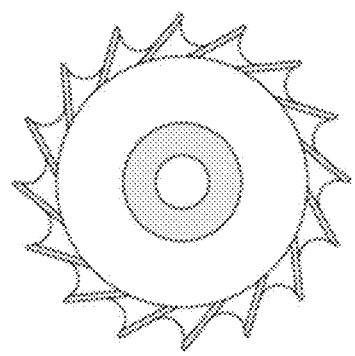
FIG. 2E presents a fifth view of the rotor design of FIG. 2A.
Figure 2F:
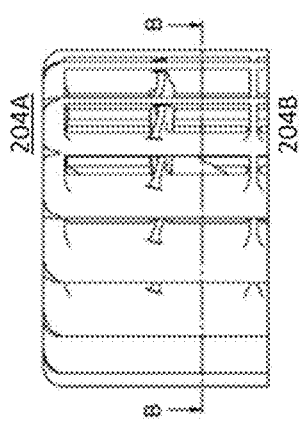
FIG. 2F presents a sixth view of the rotor design of FIG. 2A.
Figure 2G:
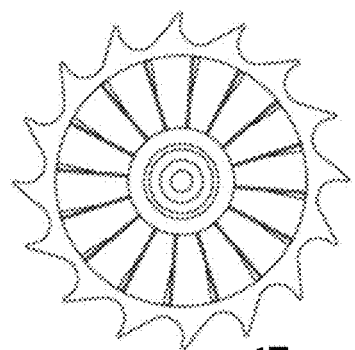
FIG. 2G presents a seventh view of the rotor design of FIG. 2A.

FIGS. 2A-2G show a first example of a novel cage-like rotor design in several views. FIG. 2A: plan bottom view complemented by FIG. 2B, a cross-section side view, and a cross-section isometric view in FIG. 2C. FIG. 2D: plan side view complemented by FIG. 2E, a cross-section plan top view, and an isometric view in FIG. 2F. FIG. 2G shows a plan top view.

In the embodiment illustrated, the rotor 200 has a central shaft receiving member 202 from which, at a low pressure input region 204A, a first rotor blade portion 206A extends substantially radially outward and is connected to a second rotor blade portion 206B which extends substantially paraxially to, and along the central shaft receiving member 202 towards a high pressure output region 204B. During operation, the first and second rotor blade portions 206A, 206B deflect gaseous matter substantially paraxially and radially inwards. In this example, a paraxial extension X of the second rotor blade portion 206B is greater than a radial extension R of the first rotor blade portion 206A. The rotor blades in the second rotor blade portion 206B comprise rounded edges 212 at an end toward the low pressure input region 204A.

The rotor blades in the first rotor blade portion 206A are inclined in relation to a first plane P1 perpendicular to the central shaft receiving member 202, and the rotor blades in the second rotor blade portion 206B are inclined in relation to a substantially hollow-cylindrical envelope contour C1 defined by the second rotor blade portion 206B.

A third rotor blade portion 206C extends substantially radially outward from the central shaft receiving member 202 and connects to the second rotor blade portion 206B at a position between the low pressure input region 204A and high pressure output region 204B, in order to enhance mechanical stability. During operation, the third rotor blade portion 206C deflects gaseous matter substantially paraxially. The rotor blades in the third rotor blade portion 206C are inclined in relation to a second plane P2 perpendicular to the central shaft receiving member 202 in order to impart an additional paraxial momentum toward the high pressure output region 204B to gaseous matter caught in the cage-like rotor 200 during rotation.

Adjacent rotor blades in the first rotor blade portion 206A, second rotor blade portion 206B and third rotor blade portion 206C substantially overlap each other such that there is hardly any direct line of sight from the inside to the outside as to prevent gaseous matter having entered the inside from escaping or otherwise leaving, except in a direction towards the high pressure output region 204B.

A ring-like support structure 208 connects the distal ends of the rotor blades in the second rotor blade portion 206B in order to enhance mechanical stability.

The central shaft receiving member 202 comprises a hollow receptacle 214 for accommodating a drive shaft (not shown) which enables setting the central shaft receiving member 202 in rotation. The central shaft receiving member 202 further comprises thickened sections 210A, 210B, each associated with one of the first and third rotor blade portions 206A, 206C having substantially radially extending rotor blades, which thickened sections 210A, 210B flare (frusto-conically) from the high pressure output region 204B to the low pressure input region 204A in order to impart the gaseous matter deflected substantially radially inwards from the second rotor blade portion 206B an additional momentum in a direction toward the high pressure output region 204B.

Figure 3A:
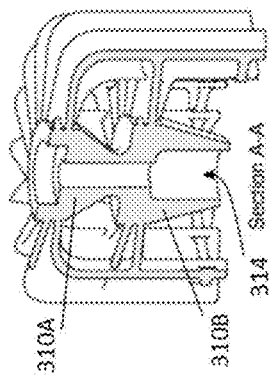
FIG. 3A presents a first view of another novel rotor design where a first radial rotor blade portion at the low pressure input end smoothly transitions into a paraxial rotor blade portion.
Figure 3B:
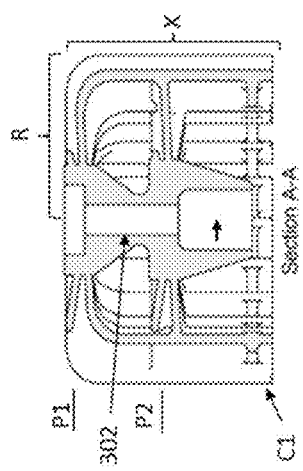
FIG. 3B presents a second view of the rotor design of FIG. 3A.
Figure 3D:
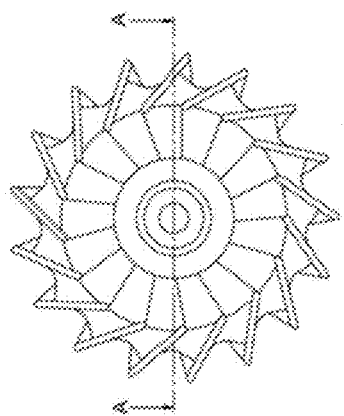
FIG. 3D presents a fourth view of the rotor design of FIG. 3A.
Figure 3C:
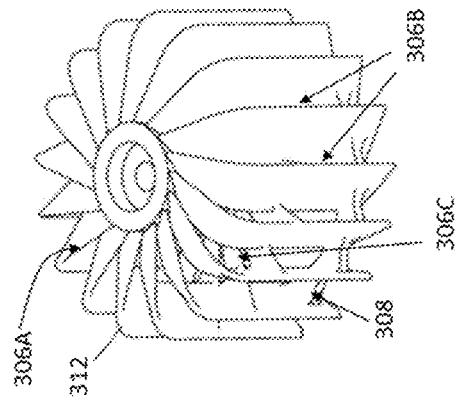
FIG. 3C presents a third view of the rotor design of FIG. 3A.
Figure 3E:
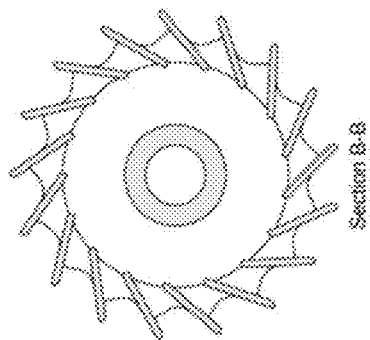
FIG. 3E presents a fifth view of the rotor design of FIG. 3A.
Figure 3F:
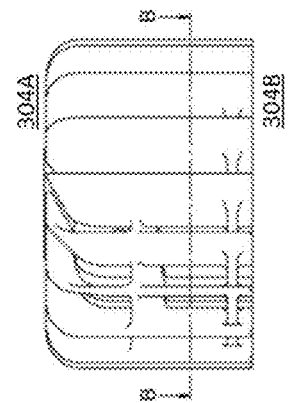
FIG. 3F presents a sixth view of the rotor design of FIG. 3A.
Figure 3G:
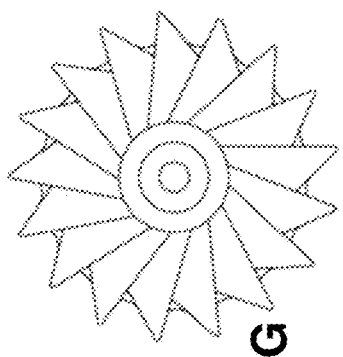
FIG. 3G presents a seventh view of the rotor design of FIG. 3A.

FIGS. 3A-3G show a further example of a novel cage-like rotor design in several views. FIG. 3A: plan bottom view complemented by FIG. 3B, a cross-section side view, and a cross-section isometric view in FIG. 3C; FIG. 3D: plan side view complemented by FIG. 3E, a cross-section top plan view, and an isometric view in FIG. 3F; FIG. 3G shows a plan top view.

In the embodiment shown, the rotor 300 has a central shaft receiving member 302 from which, at a low pressure input region 304A, a first rotor blade portion 306A extends substantially radially outward and transitions (smoothly) via rounded edges 312 into a second rotor blade portion 306B which extends substantially paraxially to, and along the central shaft receiving member 302 towards a high pressure output region 304B. During operation, the first and second rotor blade portions 306A, 306B as well as the rounded edges 312 deflect gaseous matter substantially paraxially and radially inwards. In this embodiment, a paraxial extension X of the second rotor blade portion 306B is greater than a radial extension R of the first rotor blade portion 306A.

The rotor blades in the first rotor blade portion 306A are inclined in relation to a first plane P1 perpendicular to the central shaft receiving member 302, and the rotor blades in the second rotor blade portion 306B are inclined in relation to a substantially hollow-cylindrical envelope contour C1 defined by the second rotor blade portion 306B.

A third rotor blade portion 306C extends substantially radially outward from the central shaft receiving member 302 and connects to the second rotor blade portion 306B at a position between the low pressure input region 304A and high pressure output region 304B, in order to enhance mechanical stability. During operation, the third rotor blade portion 306C deflects gaseous matter substantially paraxially. The rotor blades in the third rotor blade portion 306C are inclined in relation to a second plane P2 perpendicular to the central shaft receiving member 302.

Adjacent rotor blades in both the first rotor blade portion 306A, second rotor blade portion 306B, third rotor blade portion 306C as well as the rounded edges 312 substantially overlap each other such that there is hardly any direct line of sight from the inside to the outside as to prevent gaseous matter having entered the inside from escaping or otherwise leaving, except in a direction towards the high pressure output region 304B.

A ring-like support structure 308 connects the distal ends of the rotor blades in the second rotor blade portion 306B, in order to enhance mechanical stability.

The central shaft receiving member 302 comprises a hollow receptacle 314 for accommodating a drive shaft (not shown) which enables setting the central shaft receiving member 302 in rotation. The central shaft receiving member 302 further encompasses thickened sections 310A, 310B, each associated with one of the first and third rotor blade portions 306A, 306C having substantially radially extending rotor blades, which thickened section 310A, 310B flare (frusto-conically) from the high pressure output region 304B to the low pressure input region 304A in order to impart the gaseous matter deflected substantially radially inwards from the second rotor blade portion 306B an additional momentum in a direction toward the high pressure output region 304B.

In the embodiment shown, a number of rotor blades in the first rotor blade portion 306A, second rotor blade portion 306B and third rotor blade portion 306C is odd in order to reduce resonant vibrations and thereby further stabilize the structure during operation.

Compared to the embodiment from FIGS. 2A-2G, the rotor 300 has less mass to be rotated and still achieves even higher pumping speed in particular due to the rounded top edges 312.

Figure 4A:
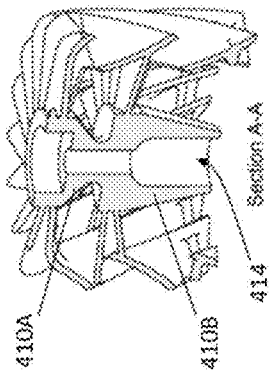
FIG. 4A illustrates a first view of yet another novel rotor design where the rotor blades in a paraxial rotor blade portion are distorted helically along a circumferential contour.
Figure 4B:
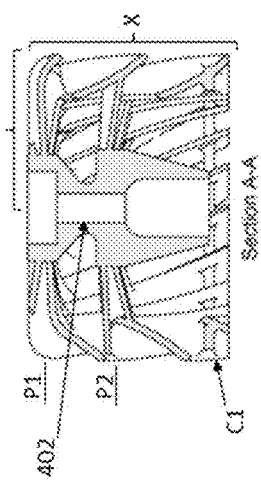
FIG. 4B presents a second view of the rotor design of FIG. 4A.
Figure 4C:
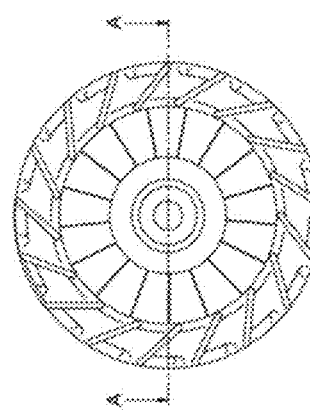
FIG. 4C presents a third view of the rotor design of FIG. 4A.
Figure 4F:
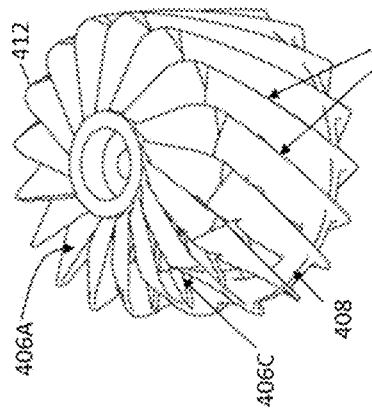
FIG. 4F presents a sixth view of the rotor design of FIG. 4A.
Figure 4D:
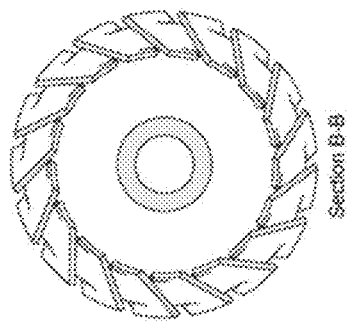
FIG. 4D presents a fourth view of the rotor design of FIG. 4A.
Figure 4E:
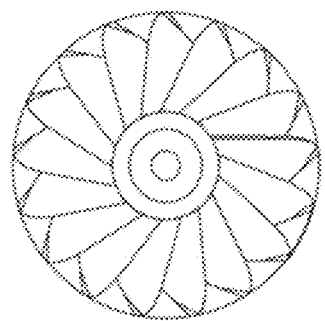
FIG. 4E presents a fifth view of the rotor design of FIG. 4A.
Figure 4G:
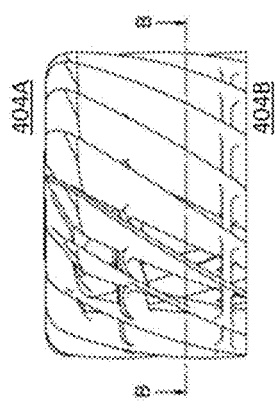
FIG. 4G presents a seventh view of the rotor design of FIG. 4A.

FIGS. 4A-4H depict a yet further example of a novel cage-like rotor design in several views. FIG. 4A: plan bottom view complemented by FIG. 4B, a cross-section side view, and a cross-section isometric view in FIG. 4C; FIG. 4D: plan side view complemented by FIG. 4E, a cross-section plan top view, and an isometric view in FIG. 4F; FIG. 4G shows a plan top view.

In the embodiment depicted, the rotor 400 has a central shaft receiving member 402 from which, at a low pressure input region 404A, a first rotor blade portion 406A extends substantially radially outward and transitions (smoothly) via rounded edges 412 into a second rotor blade portion 406B which extends substantially paraxially to, and along the central shaft receiving member 402 towards a high pressure output region 404B. During operation, the first and second rotor blade portions 406A, 406B as well as the rounded edges 412 deflect gaseous matter substantially paraxially and radially inwards.

The rotor blades in the first rotor blade portion 406A are inclined in relation to a first plane P1 perpendicular to the central shaft receiving member 402, and the rotor blades in the second rotor blade portion 406B are inclined in relation to a substantially hollow-cylindrical envelope contour C1 defined by the second rotor blade portion 406B.

In the example shown, the rotor blades in the second rotor blade portion 406B are (moderately) helically distorted along the substantially hollow-cylindrical envelope contour C1 defined by the second rotor blade portion 406B, in order to deflect the gaseous matter from the second rotor blade portion 406B both substantially paraxially and radially inwards.

A third rotor blade portion 406C extends substantially radially outward from the central shaft receiving member 402 and connects to the second rotor blade portion 406B at a position between the low pressure input region 404A and high pressure output region 404B, in order to enhance mechanical stability. During operation, the third rotor blade portion 406C deflects gaseous matter substantially paraxially. The rotor blades in the third rotor blade portion 406C are inclined in relation to a second plane P2 perpendicular to the central shaft receiving member 402.

Adjacent rotor blades in both the first rotor blade portion 406A, second rotor blade portion 406B, third rotor blade portion 406C as well as the rounded edges 412 substantially overlap each other such that there is hardly any direct line of sight from the inside to the outside as to prevent gaseous matter having entered the inside from escaping or otherwise leaving, except in a direction towards the high pressure output region 404B.

A ring-like support structure 408 connects the distal ends of the rotor blades in the second rotor blade portion 406B, in order to enhance mechanical stability.

In the embodiment shown, a paraxial extension X of the second rotor blade portion 406B is equal to or greater than a radial extension R of the first rotor blade portion 406A.

The central shaft receiving member 402 comprises a hollow receptacle 414 for accommodating a drive shaft (not shown) which enables setting the central shaft receiving member 402 in rotation. The central shaft receiving member 402 further encompasses thickened sections 410A, 410B, each associated with one of the first and third rotor blade portions 406A, 406C, respectively, having substantially radially extending rotor blades, which thickened sections 410A, 410B flare (frusto-conically) from the high pressure output region 404B to the low pressure input region 404A in order to impart the gaseous matter deflected substantially radially inwards from the second rotor blade portion 406B an additional momentum in a direction toward the high pressure output region 404B.

In the embodiment shown, the number of rotor blades in the first rotor blade portion 406A, second rotor blade portion 406B and third rotor blade portion 406C is odd in order to reduce resonant vibrations.

Figure 4H:
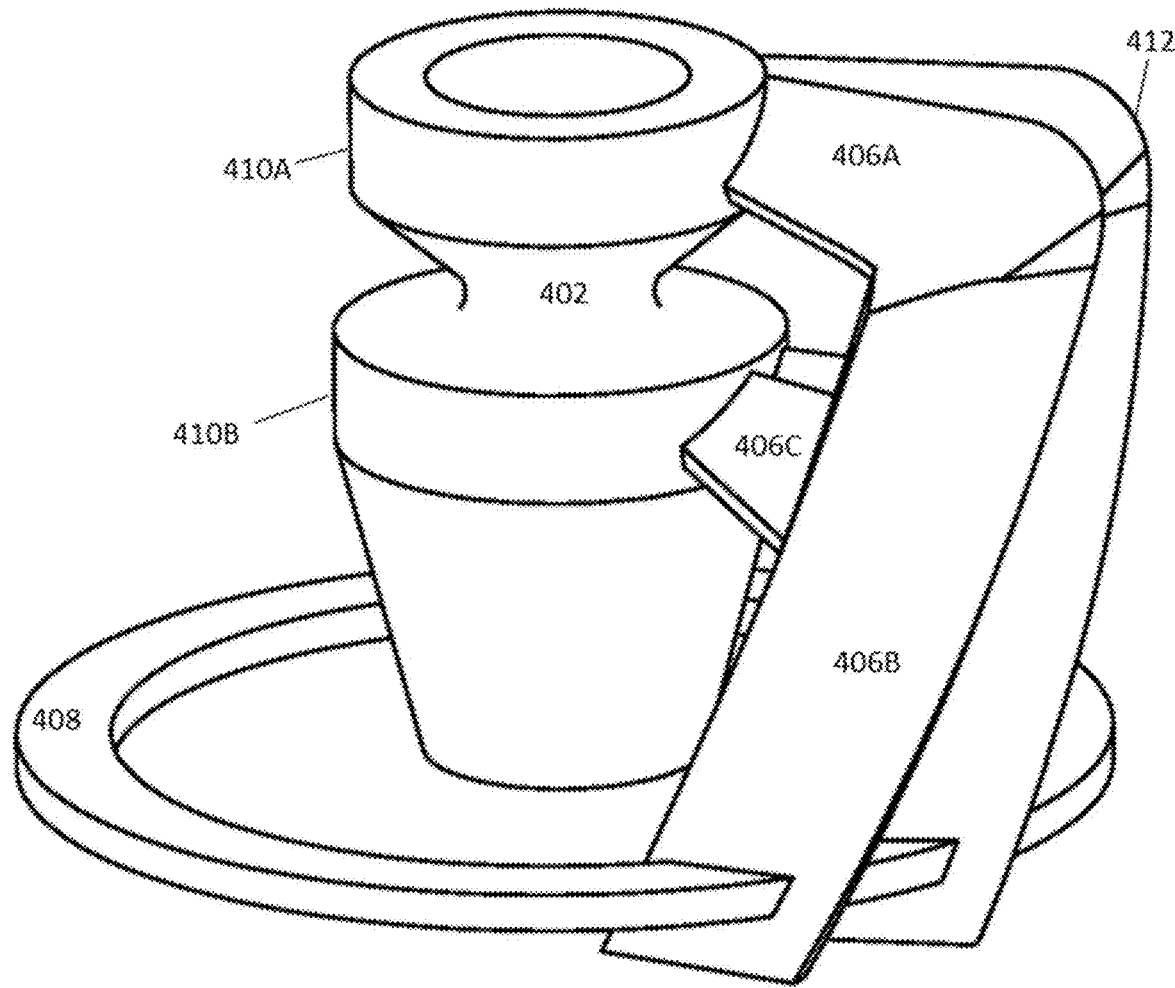
FIG. 4H complements the illustrations in FIGS. 4A-4G with reduced detail for the sake of clarity.

FIG. 4H presents the embodiment from FIGS. 4A-4G with reduced detail. All but two of the rotor blades in the first, second and third rotor blade portions 406A, 406B, 406C have been removed for the sake of clarity.

The previous FIGS. 1B to 4H describe embodiments of mechanically stable cage-like rotors. Stress simulations by computer programs reveal maximum displacements of the rotor blades in the paraxial rotor blade portions of less than 0.1 millimeters at 60,000 RPM, without rupture of the blades, meaning high mechanical integrity. The model is based on a cage-like structure having a 60 mm diameter (2×R) built around two radial rotor blade portions where the tips of the paraxial rotor blades are connected to one another by an annular support. The axial height X is set to 42 millimeters. Assuming a material of 6075 aluminum (T-6 Aircraft Aluminum), this exemplary rotor has a weight of in total about 60 grams.

Figure 5A:
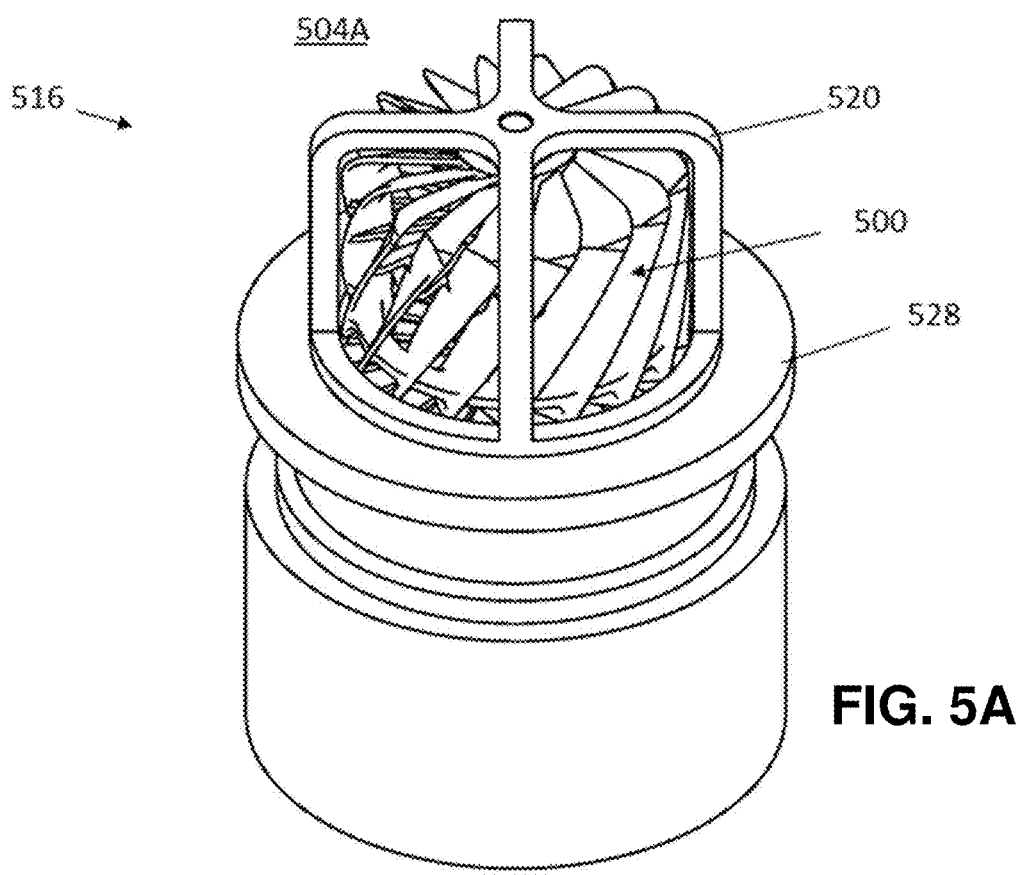
FIG. 5A shows a first view of a turbo molecular pump encompassing the novel rotor design.

FIG. 5A presents, by way of example, the novel rotor design concept in a turbo molecular pump 516 for use in a mass spectrometer. The rotor 500 in the embodiment shown may take the shape of any of the examples depicted in the FIGS. 2A-4H. Presently illustrated is a rotor design largely in accordance with that from FIGS. 4A-4H.

As evident from FIG. 5A, the turbo molecular pump 516 has next to the rotor 500 a stationary frame structure that comprises a plurality of arcs 520 converging at an end of a central shaft receiving member in a bearing (not shown) at the low pressure input region 504A which coincides with the volume of a substantially gastight compartment 530 to be evacuated in a recipient of a mass spectrometer. The stationary frame structure further comprises a flange or step 528 spaced apart from the low pressure input region 504A, to which flange or step 528 the plurality of arcs 520 is connected for mechanical support. The flange 528 tightly abuts an outer side of the bottom wall of the compartment 530 at which the turbo molecular pump 516 is mounted and helps sealing the assembly.

Figure 5B:
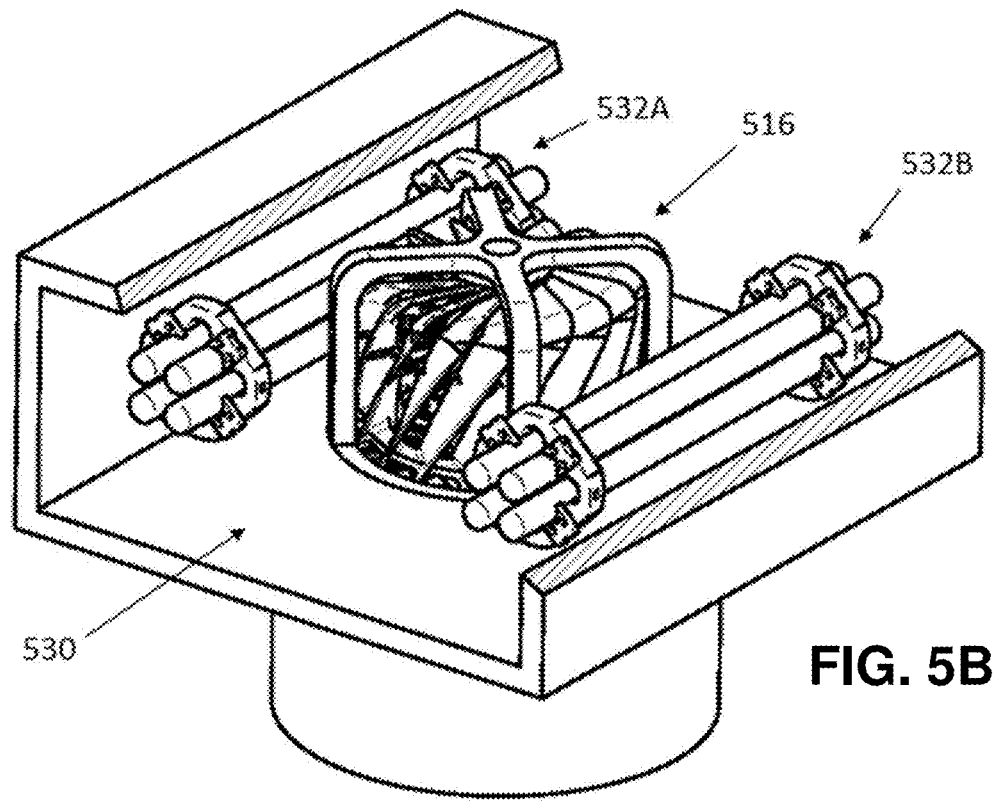
FIG. 5B shows the turbo molecular pump of FIG. 5A in its exemplary implementation in a recipient of a mass spectrometer.

As evident from FIG. 5B, just one compartment 530 of the mass spectrometer's recipient is shown (while there may be more than one, some or all of which could have to be maintained at sub-atmospheric pressure) for the sake of clarity. Cut-outs at the top and side walls allow unhindered view of the inside. In the present example, the compartment 530 contains two mass filters 532A, 532B, such as quadrupole mass filters, located parallel to one another on different sides of the compartment 530. The two mass filters 532A, 532B may be part of a triple quadrupole mass analyzer, the concept of which is well known to practitioners in the field. The two mass filters 532A, 532B may contain linear portions of a U-shaped ion path (not indicated) that leads from and through a first one of the two mass filters to and through a second one of the two mass filters via a substantially arcuate collision cell (not shown) that is fed with neutral gas to facilitate collision-induced dissociation upon injection of ions and hence ion-optically connects an exit and an entrance each of one of the two mass filters 532A, 532B, as has been illustrated by way of example in FIG. 6A of U.S. Pat. No. 8,618,473 B2 (incorporated herein by reference in its entirety). During operation, the compartment 530 is to be maintained at a pressure substantially lower than ambient atmospheric pressure for which purpose it needs to be fluidly connected to a pump 516. The main gas load in such a triple quadrupole design stems from both the ion source region as well as the collision cell (both not shown). Some portion of the gas load may originate from surface outgassing.

While traditionally, turbo molecular pumps have been mounted on such compartments to be evacuated substantially flush, with a first rotor stage at the low pressure input end being largely sunk in a bottom plate or side wall of the recipient (see schematic in FIG. 1A), the novel rotor and turbo molecular pump design deviates from this classical approach in that the pump 516 is mounted at the compartment 530 such that the rotor 500, and with it a paraxial rotor blade portion of significant extension, substantially protrudes into the compartment 530. This enables pumping action both paraxially as well as radially inwards, the latter over a full circumference of the pump rotor of 360° in the example presented. The embodiment shown in FIG. 5B enables building the compartment 530 of particularly small and slender dimension, thereby reducing size and weight significantly while increasing pumping speed.

Moreover, in the embodiment shown in FIG. 5B, the rotor 500 protrudes such as to be directly exposed to gaseous matter escaping or otherwise leaving the two mass filters 532A, 532B, which may further reduce the risk of cross-contamination therebetween. It goes without saying that other types of mass analyzer could be put into the compartment 530 in place of the two mass filters 532A, 532B, such as a time-of-flight drift tube, Kingdon-type mass analyzer such as the Orbitrap® (Thermo Fisher Scientific), 2D or 3D ion traps, and/or ion cyclotron resonance cells as non-limiting examples. Skilled practitioners in the field will acknowledge that the turbo molecular pump 516 protruding from a bottom wall of the compartment 530 at the recipient is illustrated by way of example only. It would likewise be possible to locate the turbo molecular pump 516 at any suitable one of the other boundary walls of the compartment 530, such as a top wall not shown for the sake of clarity.

Figure 5D:
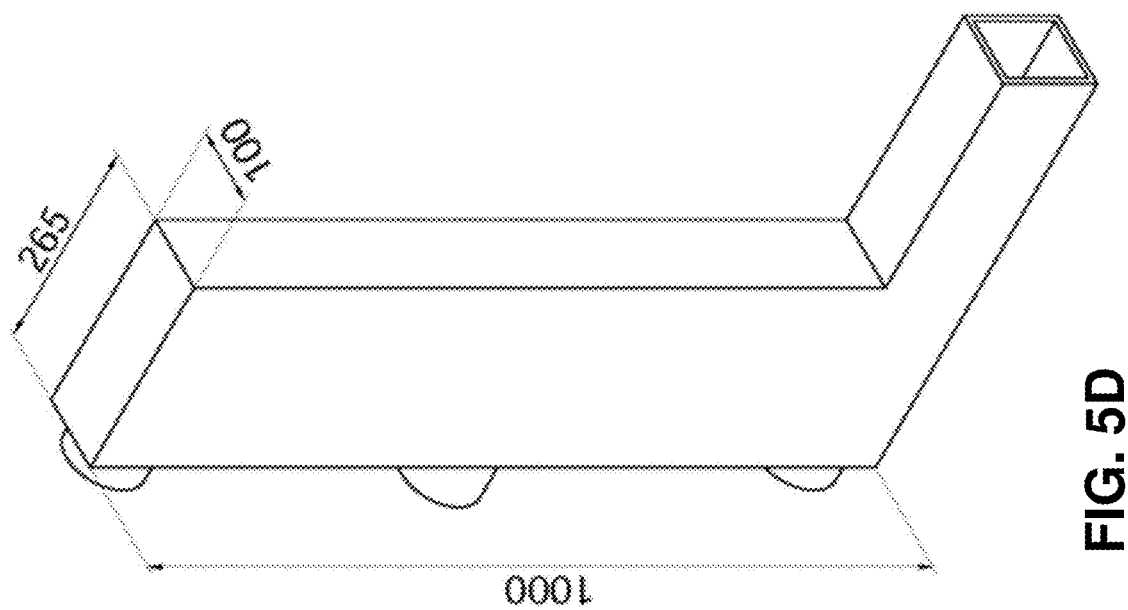
FIG. 5D shows the dimensions of the main compartment of the arrangement of FIG. 5C.
Figure 5C:
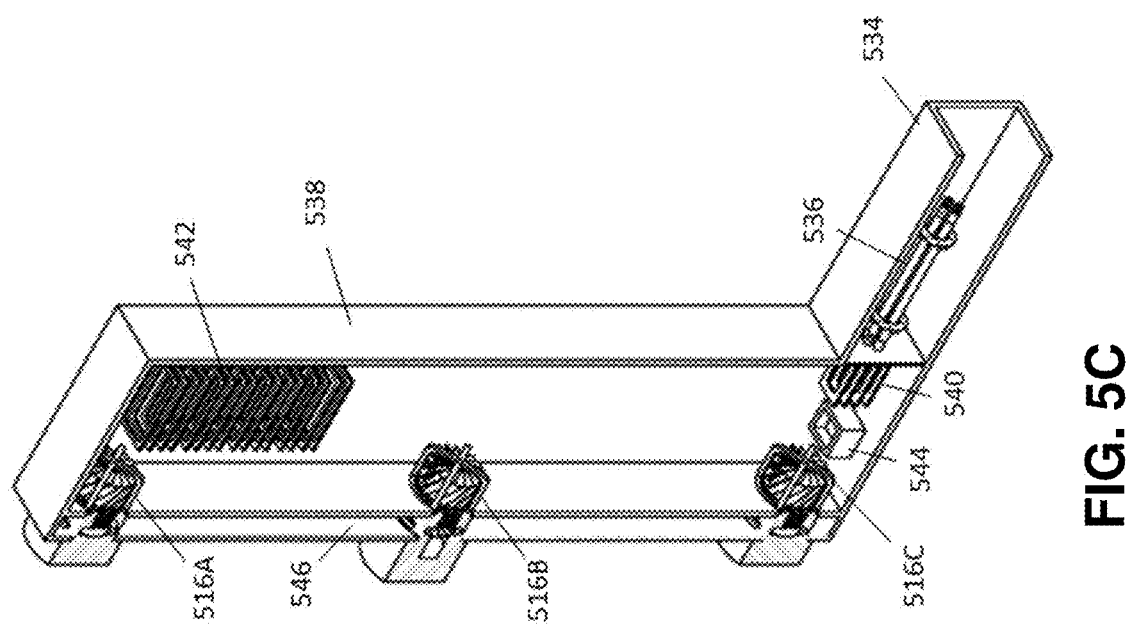
FIG. 5C shows a further exemplary implementation of a turbo molecular pump featuring the novel rotor design in a drift tube of a time-of-flight mass analyzer.

FIG. 5C depicts how a turbo molecular pump, such as the one shown in FIG. 5A, that features a novel rotor design (for example taken from any one of the embodiments as shown in FIGS. 2A-4H) can be used to evacuate a drift tube of a time-of-flight mass analyzer, in the present example with orthogonal acceleration (OTOF). The general concept of an OTOF mass spectrometer is well known to a practitioner in the field and need not be discussed further here.

In the embodiment presented, the ions to be analyzed are supplied to the time-of-flight analyzer from an ion source (not shown) fluidically and ion-optically attached to a lower leg ("horizontal leg") 534 of an L-shaped recipient. A multipole rod system 536 located in the lower leg 534 may serve to guide the ions through the lower leg 534 to the main compartment ("vertical leg") 538 of the recipient, which main compartment 538 largely represents the drift tube of a time-of-flight analyzer with orthogonal acceleration and contains a pulser 540 cell for the orthogonal acceleration, a reflector stage ("reflectron") 542 that decelerates and re-accelerates the orthogonally accelerated ions in a substantially V-shaped trajectory onto a detector 544 situated slightly laterally displaced from the pulser cell 540.

Along the extension of the elongate main compartment 538, there are shown three turbo molecular pumps 516A, 5168, 516C, having the novel rotor design, equally distributed so as to provide substantially homogenous vacuum conditions over the whole length of the main compartment 538. The number of three pumps 516A, 516B, 516C is shown by way of example here. A different number of pumps, such as one pump, two pumps or four or more pumps, is also conceivable and shall be considered as falling within the scope of the present disclosure. It will be equally acknowledged by those of skill in the art that the pumps, if there is more than one, do not necessarily have to be located at the same side of the vacuum recipient but could be mounted on different (opposing and/or adjacent) sides, as the case may be.

Each of the pumps 516A, 516B, 516C is mounted at the main compartment 538 such that its respective paraxial rotor blade portion substantially protrudes into the main compartment 538, thereby facilitating pumping action in both paraxial as well as radial directions viewed from an axis of the respective turbo molecular pump 516A, 5168, 516C. To save cost, all three turbo molecular pumps 516A, 5168, 516C may share a conventional high pressure turbo stage, operated for instance at around $10^{-4}$ Torr (~$1.3 \times 10^{-2}$ Pascal) that could be implemented in the center one 516B of the three turbo molecular pumps shown. A fluid connection between the three pumps 516A, 516B, 516C could then be ensured through an auxiliary gastight hollow compartment 546 at the mounting side of the pumps 516A, 516B, 516C as shown in FIG. 5B by way of example. The actual opening port to exhaust of the pump arrangement is not shown for the sake of clarity.

The embodiment shown in FIG. 5C enables building the main compartment 538 of particularly small and slender dimension, such as illustrated by way of example in FIG. 5D, with measures shown in millimeters.

Figure 6C:
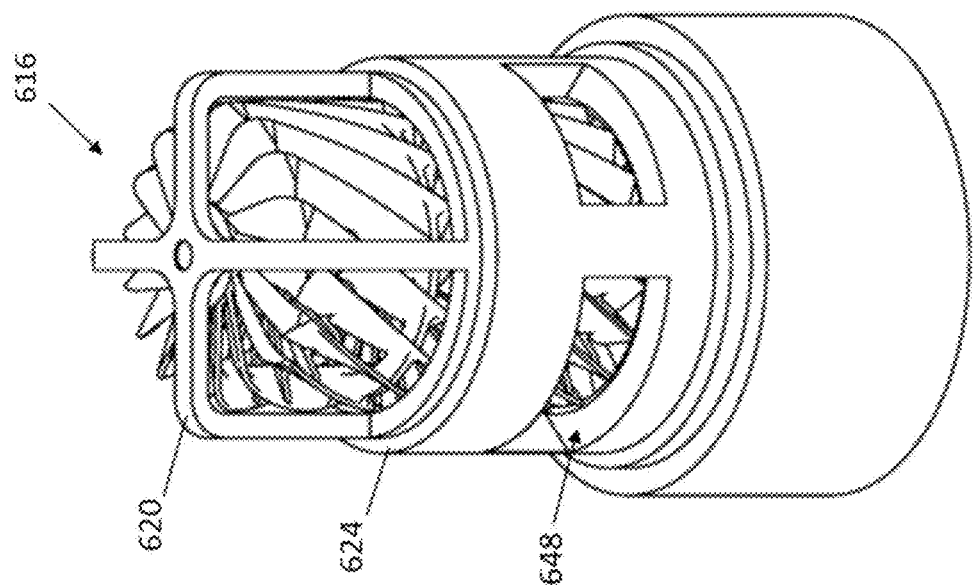
FIG. 6C depicts a third view of the turbo molecular pump of FIG. 6A.
Figure 6B:
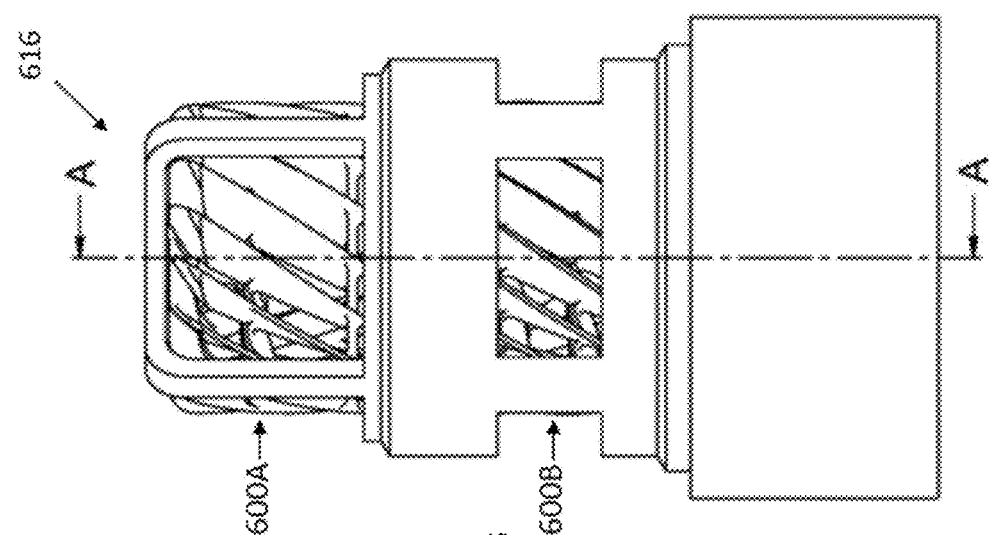
FIG. 6B depicts a second view of the turbo molecular pump of FIG. 6A.
Figure 6A:
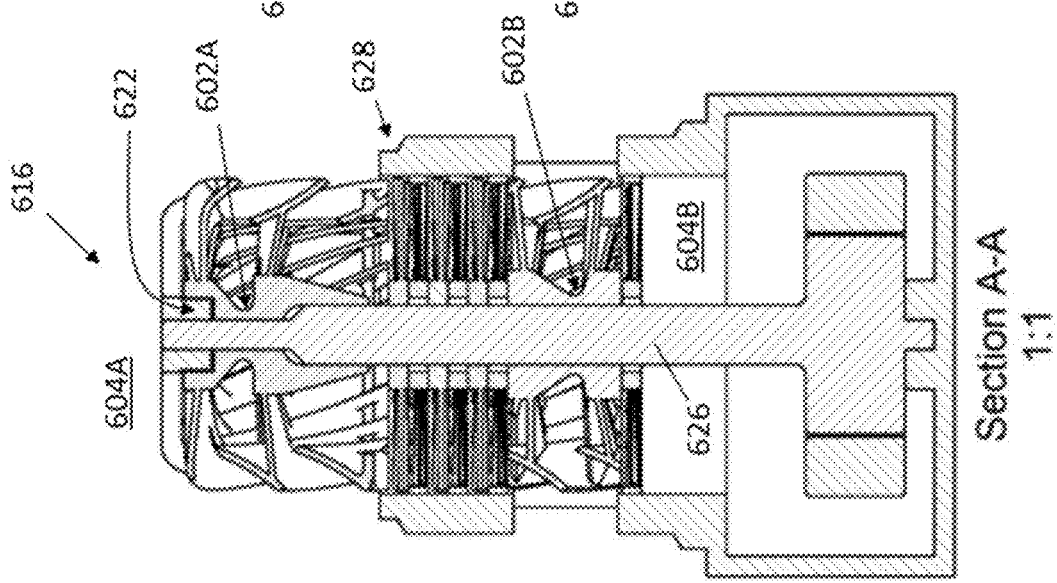
FIG. 6A depicts a first view of a multi-port turbo molecular pump encompassing the novel rotor design.

FIGS. 6A-6C show a multi-port cage-like rotor design in several different views. FIG. 6A: cross-section side view; FIG. 6B: plan side view; FIG. 6C: isometric view.

The embodiment of a turbo molecular pump 616 shown in FIGS. 6A-6C has multiple rotor stages 600A, 600B. A first rotor stage 600A, close to a low pressure input region 604A, can be implemented, for example by any one of the rotor embodiments as described in connection with the FIGS. 2A-4H. Illustrated is presently a first rotor stage 600A having a configuration as described in connection with the example from FIGS. 4A-4H.

Moreover, a second rotor stage 600B of the rotor is configured in accordance with the same principles as described with reference to previous rotor embodiments, such as the ones in any one of the FIGS. 2A-4H, for example, and therefore needs no additional explanation here. It comprises two radial rotor blade portions connected to a paraxial rotor blade portion that is lower in height (or paraxial dimension) than the paraxial rotor blade portion implemented in the first rotor stage at the low pressure input region. The stationary frame structure or casing at the second downstream rotor stage 600B is provided with lateral port openings 648 so that the paraxial rotor blade portion in the second rotor stage 600B can be fluidly connected to a compartment to be evacuated to a pressure level different to and higher than that to be maintained by the first rotor stage 600A at the top of the turbo molecular pump 616 shown.

The turbo molecular pump of FIGS. 6A-6C has a stationary frame structure which comprises a plurality of arcs 620 converging at an end of the first central shaft receiving member 602A close to the low pressure input region 604A in a bearing 622, which could be a magnetic bearing having a plurality of permanent magnets or ball bearing having a plurality of ceramic balls with super-sleek surfaces. The ball bearing may be lubricated with a special grease featuring extremely low vapor pressure. Furthermore, the stationary frame structure comprises a flange or step 624 that is spaced apart from the low pressure input region 604A, to which flange or step 624 the plurality of arcs 620 is connected. The flange or step 624 serves, in particular, for mounting the turbo molecular pump 616 to a chamber to be evacuated during operation and sealing this connection.

The second central shaft receiving member 602B of the second rotor stage 600B, has a hollow receptacle for accommodating a drive shaft 626 (just like the first central shaft receiving member of the first rotor stage 600A, though not designated in the present illustration) which enables setting the second central shaft receiving member 602B (together with the first central shaft receiving member in the first rotor stage 600A) in rotation during operation.

The second central shaft receiving member 602B flares section-wise from the high pressure output region 604B to the low pressure input region 604A in order to impart the gaseous matter deflected substantially radially inwards from the paraxial rotor blade portion in the second rotor stage 600B an additional momentum in a direction toward the high pressure output region.

A conventional rotor-stator stage 628 having radially extending, interdigital rotor-stator blades is located between the first rotor stage 600A (featuring a rotor as disclosed in any one of the embodiments from the FIGS. 2A-4H), and the second rotor stage 600B (featuring a rotor that may be configured likewise according to the principles disclosed in any one of the embodiments from the FIGS. 2A-4H) along the central drive shaft 626 that is accommodated in hollow receptacles of the first and second central shaft receiving members 602A, 602B, respectively, and actuated by a motor.

Figure 6D:
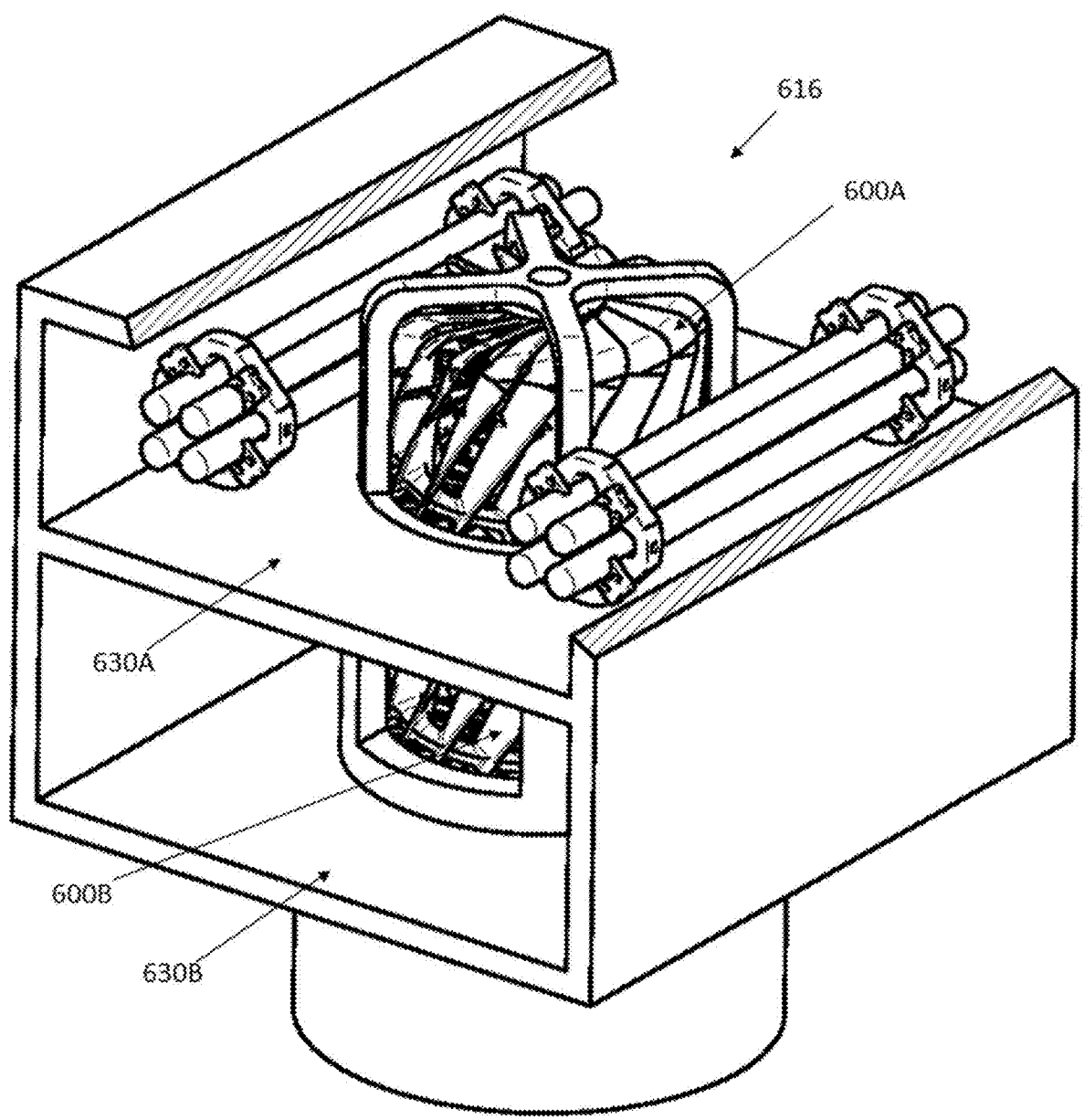
FIG. 6D shows an exemplary implementation of a multi-port turbo molecular pump as is displayed in FIG. 6A in a recipient of a mass spectrometer.

FIG. 6D illustrates by way of example the use of a multi-port turbo molecular pump 616 as has been described hereinbefore in a mass spectrometer.

The mass spectrometer has a recipient which contains at least two adjacent compartments of which two 630A, 630B are illustrated. During operation, the compartments 630A, 630B are to be maintained at slightly different pressures that are substantially lower than an ambient atmospheric pressure, for example the compartment 630A is used for the mass filters at ultra high vacuum (e.g. around $10^{-7}$ Torr or less; ~$1.3 \times 10^{-5}$ Pascal). The lower compartment 630B may contain an ion source, such as an electrospray source, a chemical ionization source or an electron ionization source, the principles of all of which are well known to practitioners in the field, and can be kept at a higher pressure level of for instance around $10^{-4}$ a Torr (~$1.3 \times 10^{-2}$ Pascal). A turbo molecular pump of multi-port configuration 616 as described, for instance, in connection with FIGS. 6A-6C (and having rotors which may be embodied according to one of the examples shown in any one of the FIGS. 2A-4H) is mounted at the two adjacent compartments 630A, 630B such that the first rotor stage 600A, and with it the associated paraxial rotor blade portion, substantially protrudes into a first 630A of the at least two adjacent compartments and the second rotor stage 600B, and with it the correspondingly associated paraxial rotor blade portion, is fluidically connected through port openings to a second 630B of the at least two adjacent compartments whose pressure is to be maintained at a slightly higher level than that in the first compartment 630A since it is fluidly connected to the pump 616 closer to the high pressure exhaust section.

FIG. 6D illustrates an example of a multi-port turbo molecular pump 616 comprising two rotor stages 600A, 600B with corresponding port openings 648. It will be understood by those of skill in the art that the concept of a multi-port turbo molecular pump comprising the novel rotor design can be extended two more than two novel rotor stages (in addition to conventional rotor-stator stages) with corresponding port openings, as a practitioner in the field sees fit.

The rotor stage(s) in the embodiments of any one of the preceding FIGS. 1B to 6D can be produced from stable metals such as aluminum, magnesium, titanium or alloys thereof. In particular, the rotor stage(s) can be produced by additive manufacturing such as powder fusing, or cast in one piece, using for example stable materials such as titanium aluminide (TiAl).

Aluminum and titanium are favorable metals for additive manufacturing of metal parts with extremely high mechanical strength and temperature resistance. Additive manufacturing has the additional advantage that quite unusual alloys having properties far from standard alloys can be used.

As an example, for a material of high mechanical strength in spite of low weight, gamma TiAl, an intermetallic compound of aluminum and titanium (titanium aluminide), has excellent mechanical properties as well as oxidation and corrosion resistance at elevated temperatures (over 600 degrees centigrade). Gamma TiAl is used for the blades in modern aircraft turbo engines because of its excellent thrust-to-weight ratio. Additive manufacturing can produce parts consisting of such an alloy-like intermetallic compound.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention which is defined solely by the appended claims, including any equivalent implementations, as the case may be.

The invention claimed is:

1. A turbo molecular pump comprising a stationary frame structure and at least one rotor stage located at a low pressure input region, wherein the at least one rotor stage is substantially accommodated within or substantially resides inside the stationary frame structure, wherein the rotor in the at least one rotor stage rotates about an axis with respect to the stationary frame structure during operation and has an axially aligned central shaft receiving member from which a first rotor blade portion extends substantially radially outward and is connected to a second rotor blade portion which extends substantially paraxially to, and along the central shaft receiving member towards a high pressure output region, wherein, during operation, the first and second rotor blade portions deflect gaseous matter substantially paraxially and radially inwards, wherein the central shaft receiving member, the first rotor blade portion and the second rotor blade portion are designed and configured such that there is a substantially free path between the second rotor blade portion and the central shaft receiving member for gaseous matter deflected substantially radially inwards.

2. The turbo molecular pump of claim 1, wherein the rotor blades in the first rotor blade portion are inclined in relation to a first plane perpendicular to the central shaft receiving member, and wherein the rotor blades in the second rotor blade portion are inclined in relation to a substantially hollow-cylindrical envelope contour defined by the second rotor blade portion.

3. The turbo molecular pump of claim 1, wherein adjacent rotor blades in at least one of the first rotor blade portion and second rotor blade portion substantially overlap each other such that there is no direct line of sight from inside to outside so as to prevent gaseous matter having entered the inside from escaping or otherwise leaving, except in a direction towards the high pressure output region.

4. The turbo molecular pump of claim 1, further comprising a ring-like support structure that connects the distal ends of the rotor blades in the second rotor blade portion in order to enhance mechanical stability.

5. The turbo molecular pump of claim 1, wherein the rotor blades in the second rotor blade portion comprise rounded edges at a point of connection to the rotor blades in the first rotor blade portion.

6. The turbo molecular pump of claim 1, wherein the first rotor blade portion transitions into the second rotor blade portion.

7. The turbo molecular pump of claim 1, wherein a paraxial extension of the second rotor blade portion is equal to or greater than a radial extension of the first rotor blade portion.

8. The turbo molecular pump of claim 1, wherein the central shaft receiving member comprises a hollow receptacle for accommodating a drive shaft which enables setting the central shaft receiving member in rotation.

9. The turbo molecular pump of claim 1, wherein the central shaft receiving member flares from the high pressure output region to the low pressure input region, at least section-wise, in order to impart the gaseous matter deflected substantially radially inwards from the second rotor blade portion an additional momentum in a direction toward the high pressure output region.

10. The turbo molecular pump of claim 1, wherein the rotor blades in the second rotor blade portion are helically distorted along a substantially hollow-cylindrical envelope contour defined by the second rotor blade portion in order to deflect the gaseous matter from the second rotor blade portion both substantially paraxially and radially inwards.

11. The turbo molecular pump of claim 1, wherein the rotor in the at least one rotor stage is produced from stable metals or alloys thereof.

12. The turbo molecular pump of claim 11, wherein the rotor in the at least one rotor stage is produced from aluminum, magnesium, titanium or alloys thereof.

13. The turbo molecular pump of claim 1, further comprising, in a multi-port configuration, a second rotor stage at a position spaced apart from the low pressure input region, which second rotor stage is of similar configuration as the at least one rotor stage located at the low pressure input region.

14. The turbo molecular pump of claim 1, wherein a number of rotor blades in at least one of the first rotor blade portion and second rotor blade portion is odd in order to reduce resonant vibrations.

15. A turbo molecular pump comprising a stationary frame structure and at least one rotor stage located at a low pressure input region, wherein the rotor in the at least one rotor stage rotates about an axis with respect to the stationary frame structure during operation and has an axially aligned central shaft receiving member from which a first rotor blade portion extends substantially radially outward and is connected to a second rotor blade portion which extends substantially paraxially to, and along the central shaft receiving member towards a high pressure output region, wherein, during operation, the first and second rotor blade portions deflect gaseous matter substantially paraxially and radially inwards, further comprising a third rotor blade portion which extends substantially radially outward from the central shaft receiving member and connects to the second rotor blade portion at a position between the low pressure input region and high pressure output region axially offset from the first rotor blade portion, in order to enhance mechanical stability, wherein, during operation, the third rotor blade portion deflects gaseous matter substantially paraxially.

16. The turbo molecular pump of claim 15, wherein the rotor blades in the third rotor blade portion are inclined in relation to a second plane perpendicular to the central shaft receiving member.

17. The turbo molecular pump of claim 15, wherein a number of rotor blades in at least one of the first rotor blade portion, second rotor blade portion and third rotor blade portion is odd in order to reduce resonant vibrations.

18. The turbo molecular pump of claim 15, wherein adjacent rotor blades in at least one of the first rotor blade portion, second rotor blade portion and third rotor blade portion substantially overlap each other such that there is no direct line of sight from inside to outside so as to prevent gaseous matter having entered the inside from escaping or otherwise leaving, except in a direction towards the high pressure output region.

19. A mass spectrometer, comprising:
a recipient which has at least one compartment that, during operation, is to be maintained at a pressure substantially lower than ambient atmospheric pressure, and
a turbo molecular pump comprising a stationary frame structure and at least one rotor stage located at a low pressure input region, wherein the at least one rotor stage is substantially accommodated within or substantially resides inside the stationary frame structure, wherein the rotor in the at least one rotor stage rotates about an axis with respect to the stationary frame structure during operation and has an axially aligned central shaft receiving member from which a first rotor blade portion extends substantially radially outward and is connected to a second rotor blade portion which extends substantially paraxially to, and along the central shaft receiving member towards a high pressure output region, wherein, during operation, the first and second rotor blade portions deflect gaseous matter substantially paraxially and radially inwards, wherein the central shaft receiving member, the first rotor blade portion and the second rotor blade portion are designed and configured such that there is a substantially free path between the second rotor blade portion and the central shaft receiving member for gaseous matter deflected substantially radially inwards, and
wherein the turbo molecular pump is mounted at the at least one compartment such that the second rotor blade portion substantially protrudes into the at least one compartment.

20. The mass spectrometer of claim 19, wherein the at least one compartment contains at least one mass analyzer or at least one source of gas, and the second rotor blade portion protrudes such as to be directly exposed to gaseous matter escaping or otherwise leaving the at least one mass analyzer and emanating from the at least one source of gas, respectively.

21. The mass spectrometer of claim 19, wherein the at least one compartment contains at least one of a time-of-flight drift tube, Kingdon-type mass analyzer, 2D or 3D ion trap, mass filter and an ion cyclotron resonance cell.

22. A mass spectrometer, comprising:
a recipient which has at least two adjacent compartments that, during operation, are to be maintained at pressures substantially lower than ambient atmospheric pressure, and
a turbo molecular pump of multi-port configuration comprising a stationary frame structure and at least a first rotor stage located at a low pressure input region, wherein the at least one rotor stage is substantially accommodated within or substantially resides inside the stationary frame structure, wherein the rotor in the first rotor stage rotates about an axis with respect to the stationary frame structure during operation and has an axially aligned central shaft receiving member from which a first rotor blade portion extends substantially radially outward and is connected to a second rotor blade portion which extends substantially paraxially to, and along the central shaft receiving member towards a high pressure output region, wherein, during operation, the first and second rotor blade portions deflect gaseous matter substantially paraxially and radially inwards, wherein the central shaft receiving member, the first rotor blade portion and the second rotor blade portion are designed and configured such that there is a substantially free path between the second rotor blade portion and the central shaft receiving member for gaseous matter deflected substantially radially inwards, and comprising a second rotor stage at a position spaced apart from the low pressure input region, which second rotor stage is of similar configuration as the first rotor stage located at the low pressure input region,
wherein the turbo molecular pump of multi-port configuration is mounted at the at least two adjacent compartments such that the second rotor blade portion substantially protrudes into a first one of the at least two adjacent compartments and the second rotor stage is fluidically connected to a second one of the at least two adjacent compartments.

* * * * *